Figure 1:
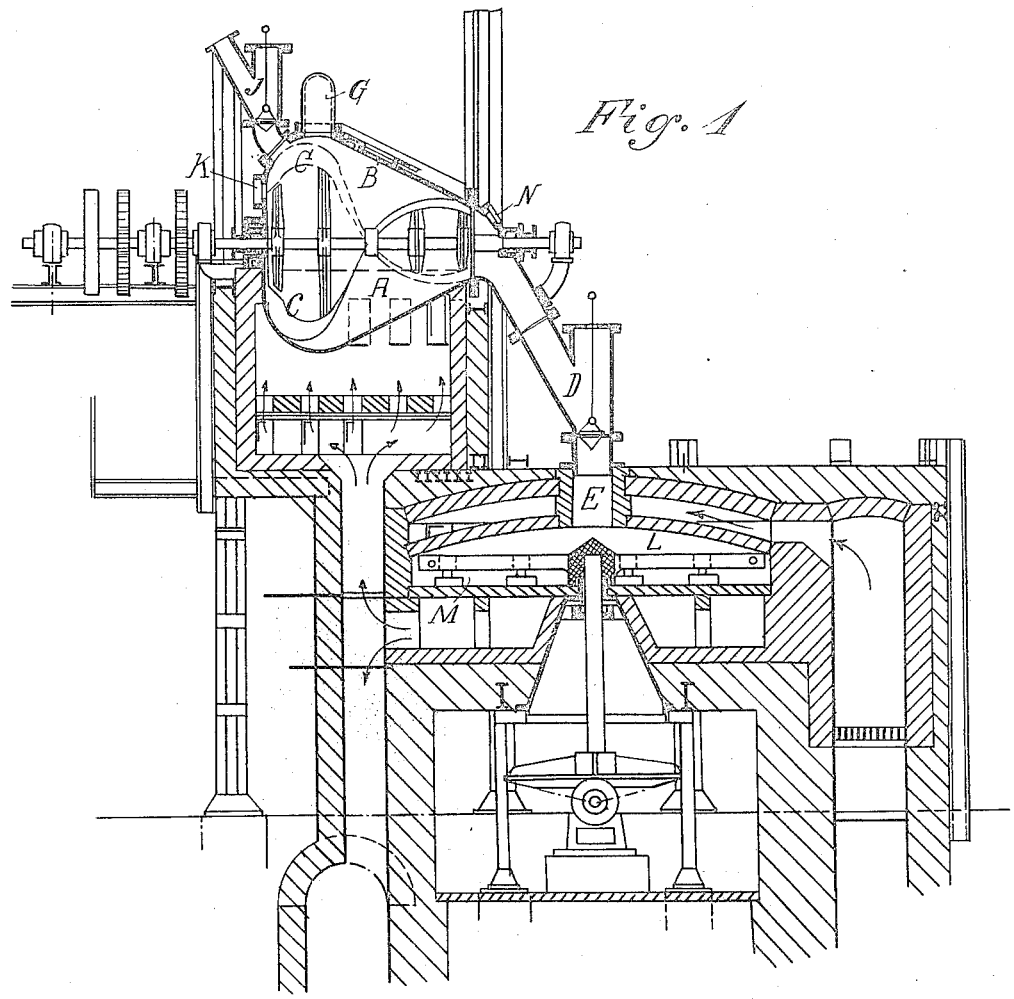

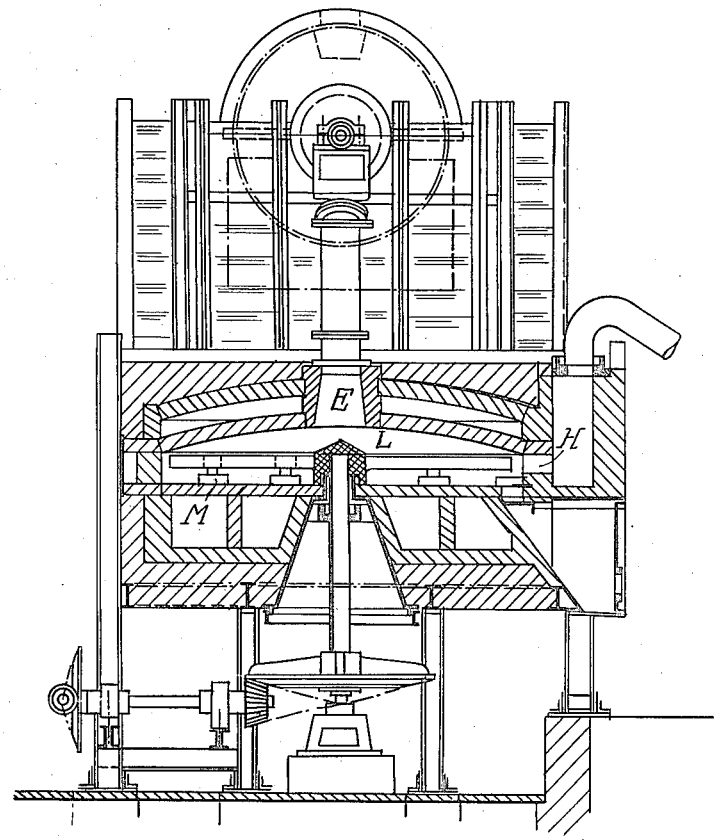

UNITED STATES PATENT OFFICE.

KARL THELEN AND FRANZ WOLF, OF STOLBERG, GERMANY.

MECHANICAL SULFATE-FURNACE.

1,165,815.  Specification of Letters Patent.  Patented Dec. 28, 1915.

Application filed June 1, 1914. Serial No. 842,129.

*To all whom it may concern:*

Be it known that we, KARL THELEN and FRANZ WOLF, subjects of the German Emperor, and both residents of Stolberg 2, Rhineland, Germany, have invented certain new and useful Improvements in Mechanical Sulfate-Furnaces, of which the following is a specification.

The manufacture of sodium sulfate from sulfuric acid, bisulfate, and common salt, with the simultaneous obtainment of hydrochloric acid produced thereby, has not been successful when carried out in a mechanical way.

The object of this invention is to so improve the sulfate-sulfuric acid process that the manual operations which have been so successful hitherto can be mechanically imitated, the calcining furnace having arranged in front of it a pan working periodically, which pan is fitted with a special stirring device which mixes and conveys according to the direction of the rotation.

In the accompanying drawing Figure 1 shows, in longitudinal section, a furnace constructed in accordance with this invention and Fig. 2 is a cross-section thereof.

A is a pan of pear shape closed by a lid B. In this pear-shaped pan a helical stirring device C rotates. When this device is rotated clock-wise it mixes the material and, when rotated counter-clockwise, it conveys the material through the discharge opening N, the shaft D, and the cone E, toward the calcining furnace, where the material is seized by the stirring mechanism L, of the said furnace, and slowly moved in a spiral path toward the outlet by means of scrapers M which are arranged freely in a self-adjusting manner in vertical direction.

The gaseous hydrochloric acid in the pan escapes therefrom through the opening G in the lid, and that in the calcining furnace escapes by the passage H. The pan is charged with the solid materials through a pipe J which is capable of being closed, and the liquid material is admitted through the inlet K. The gases from the furnace pass around the muffle and then heat the pan.

Having now particularly described and ascertained the nature of our said invention and in what manner the same is to be performed, we declare that what we claim is:—

1. In a mechanical sulfate furnace, the combination of a suitable furnace, an elevated receptacle for the raw materials, a conduit adapted to conduct material from said receptacle to the furnace, rotary means for coöperating with the receptacle to mix raw materials therein when turning in one direction and to discharge the contents of the receptacle into said conduit when turned in the opposite direction, and means for heating the receptacle.

2. In a mechanical sulfate furnace, the combination of a suitable furnace, an elevated receptacle for the raw materials, a conduit adapted to conduct material from said receptacle to the furnace, rotary means for coöperating with the receptacle to mix raw materials therein when turning in one direction and to discharge the contents of the receptacle into said conduit when turned in the opposite direction, and means for directing heated gases from the furnace against said receptacle to heat the contents thereof.

In testimony whereof we have signed our names to this specification in the presence of two subscribing witnesses.

KARL THELEN.
FRANZ WOLF.

Witnesses:
 FRIEDRICH PTOLLEWERK,
 PAUL DREES.